US007275045B2

(12) United States Patent
Muneishi et al.

(10) Patent No.: US 7,275,045 B2
(45) Date of Patent: Sep. 25, 2007

(54) PRODUCT ORDERING METHOD AND SYSTEM

(75) Inventors: Tomio Muneishi, Hiroshima (JP); Takamichi Teraoka, Hiroshima (JP); Yukinori Shigemoto, Hatsukaichi (JP)

(73) Assignee: Juken Sangyo Co., Ltd. (JP)

( * ) Notice: Subject to any disclaimer, the term of this patent is extended or adjusted under 35 U.S.C. 154(b) by 808 days.

(21) Appl. No.: 10/166,001

(22) Filed: Jun. 10, 2002

(65) Prior Publication Data

US 2002/0188526 A1 Dec. 12, 2002

(30) Foreign Application Priority Data

Jun. 11, 2001 (JP) ............................. 2001-176342

(51) Int. Cl.
*G06Q 30/00* (2006.01)
(52) U.S. Cl. .......................................... 705/26; 705/27
(58) Field of Classification Search ............ 705/26–27
See application file for complete search history.

(56) References Cited

U.S. PATENT DOCUMENTS

| 6,295,513 | B1 * | 9/2001 | Thackston | ...................... 703/1 |
| 6,999,965 | B1 * | 2/2006 | Cesarotti et al. | ............. 707/100 |
| 7,072,061 | B2 * | 7/2006 | Blair et al. | ................. 358/1.15 |
| 2001/0034631 | A1 * | 10/2001 | Kiselik | ........................... 705/8 |
| 2001/0047311 | A1 * | 11/2001 | Singh | ........................... 705/26 |
| 2002/0016725 | A1 * | 2/2002 | Eichstaedt et al. | .............. 705/7 |
| 2002/0165744 | A1 * | 11/2002 | Juras et al. | ..................... 705/7 |

FOREIGN PATENT DOCUMENTS

| JP | 5-303323 A | 11/1993 |
| JP | 7-129625 A | 5/1995 |
| JP | 8-115370 A | 5/1996 |
| JP | 2000-137724 A | 5/2000 |

OTHER PUBLICATIONS

MfgQuote: Thailmay, Jean; "Making a Match," Mechanical Engineering, Dec. 2000, v122n12pg62 5pgs, Proquest #65028854.*
MfgQuote: www.mfgquote.com; Internet Archive Wayback Machine, www.archive.org; 6pgs, Feb. 1, 2001.*
MfgQuote: "ManufacturingQuote.com, Inc. Introduces Collaborative Procurement Management and Breaks Technology Ground with Version Two Web Site," PR Newswire, Aug. 14, 2000, Proquest #57915076.*
Kelly, Katherine; "MMS Internet News," Modern Machine Shop, Oct. 2000, v73n5pg230, 2pgs, Proquest #64915733.*
MfgQuote: "ManufacturingQuote eProcurement Technology Reaches New Summit with Version 3 of MfgQuote.com,"PR Newswire, May 8, 2001, Proquest #725736618, 3pgs.*

* cited by examiner

*Primary Examiner*—Robert M. Pond
(74) *Attorney, Agent, or Firm*—McGlew and Tuttle P.C.

(57) ABSTRACT

A terminal sends to a host computer CAD drawing data which contains basic specifications of products ordered by a customer. The host computer manages product catalog information including price information of products for which orders can be accepted and customer planning information in which planning information of each customer about detail specifications of products has been registered, receives the CAD drawing data sent from the terminal, extracts the basic specifications of the ordered products from the CAD drawing data, searches the product catalog information using the extracted basic specifications of the ordered products and the customer planning information, creates quotation data based on retrieved product catalog information, and sends the quotation data to the terminal.

7 Claims, 18 Drawing Sheets

FIG. 5

RETRIEVE CAD DATA

> RETRIEVE CAD DATA
> ON JOINERY

> (1) CALCULATE SHAPES OF JOINERY PARTS
>     SINGLE SWINGING DOOR,
>     TWO-LEAF DOOR, SINGLE SLIDING DOOR,
>     DOUBLE DOORS ···

> (2) CALCULATE SHAPES OF ROOMS
>     ON BOTH SIDES OF JOINERY
>         WESTERN-STYLE, JAPANESE-STYLE,
>         LIVING, LAVATORY, OR CORRIDOR
>     WESTERN-WESTERN: PANEL DOOR
>     LIVING-WESTERN: GLASS DOOR
>     LAVATORY-WESTERN: LAVATORY DOOR
>     JAPANESE-WESTERN: JAPANESE-STYLE
>                       JOINERY
>     JAPANESE-JAPANESE: JAPANESE-STYLE
>                        FRAME MATERIAL
>     ...

> (3) CALCULATE SIZE OUTSIDE THE FRAME
>     FROM THE SHAPE OF BOTH SIDES OF DOOR FRAME
>   IN THE CASE OF A SINGLE DOOR
>   ONE INSIDE CORNER:
>     SIZE OUTSIDE THE FRAME >= MODULE - COLUMN SIZE
>   TWO INSIDE CORNERS:
>     SIZE OUTSIDE THE FRAME >= MODULE - COLUMN SIZE
>     - (FURRING STRIP + PLASTER BOARD) -4
>   TWO WINGS:
>     SIZE OUTSIDE THE FRAME >= MODULE - COLUMN SIZE
>     - (FURRING STRIP + PLASTER BOARD)* 2 -8

FIG. 6

OBTAIN DATA FROM QUOTATION CONDITION SETTINGS (5) PRODUCT SERIES
OAK, JUPINO ··

(6) COLOR
NATURAL BROWN, DARK BROWN ··

(7) DESIGN
S-AP, Q-HK, M-IK (8) TYPE OF LEVER
LATCH, PARTITION LOCK ··

(9) SILL
NONE(THREE-SIDED FRAME), Q TYPE(VENEER),
F TYPE(RESIN)

(10) SHAPE OF FRAME
ADJUSTABLE FRAME, CASING TYPE, FIXED FRAME

FIG. 7

OBTAIN DATA FROM BUILDING INFORMATION

SHAPE OF BUILDING (4) CALCULATE WALL THICKNESS
    CONVENTIONAL: COLUMN SIZE +
        (FURRING STRIP + PLASTER BOARD) × 2

FIG. 8

SEARCH FOR PARTS NUMBERS THAT SATISFY THE ABOVE CRITERIA

FRAME SEARCH KEY
(1), (2)   PRODUCT CLASSIFICATION: FRAME FOR SINGLE DOOR, FRAME FOR TWO-LEAF DOOR ···
(3)        SIZE OUTSIDE THE FRAME: 881, 796, 770, 734
(5)        SERIES
(6)        COLOR
(9)        SILL

DOOR SEARCH KEY
(1), (2)   PRODUCT CLASSIFICATION: SINGLE PANEL DOOR, SINGLE GLASS DOOR, LAVATORY DOOR
(3)        SIZE OUTSIDE THE FRAME: 881, 796, 770, 734
(5)        SERIES
(6)        COLOR
(9)        SILL

CASING SEARCH KEY
(1), (2)   PRODUCT CLASSIFICATION: CASING SET
(3)        SIZE OUTSIDE THE FRAME: 881, 796, 770, 734
(4)        WALL THICKNESS: A: 113 TO 133mm; B: 134 TO 159mm; C: 160 TO 179mm; E: 114mm(FOR 2×4)
(5)        SERIES
(6)        COLOR
(9)        SILL
(10)       SHAPE OF FRAME: REGULAR TYPE, DELUXE TYPE

FIG. 9

BASIC INFORMATION INPUT SCREEN

BASIC INFORMATION INPUT

| STRUCTURE | WOODEN | NON-WOODEN | |
|---|---|---|---|
| CONSTRUCTION METHOD | WOOD-FRAME CONSTRUCTION | 2 × 4 | OTHER ▼ |
| MODULE | 910m/m | 955m/m | 1000m/m | OTHER ( ) m/m |

WALL STRUCTURE

| COLUMN SIZE | 105m/m | 120m/m | OTHER ( ) m/m |
|---|---|---|---|
| FURRING STRIP | NONE (INNER FURRING STRIP) | 13m/m | 15m/m | OTHER ( ) m/m |
| | 18m/m | | |
| WALL-FINISHING MATERIAL (PLASTER BOARD) | 9.5m/m | 12.5m/m | OTHER ( ) m/m |

| WALL THICKNESS | 130 m/m |
|---|---|

SKIP    GO

FIG. 13

QUOTATION ITEM SELECTION SCREEN

QUOTATION ITEM

| Left column | Right column |
|---|---|
| 1. JOINERY (DOORS, CLOTHES CLOSETS, ETC.) | 10. FREE-SIZE COUNTER BOARDS |
| 2. STORAGE SPACE (CLOSET SETS, STORAGE PARTS) | 11. STORAGE FURNITURE IN WESTERN-STYLE ROOM |
| 3. STORAGE FURNITURE IN ENTRANCE HALL (BUILT-IN STORAGE UNIT, SHOE CUPBOARD) | 12. JAPANESE-STYLE FIXTURE LUMBER (HORIZONTAL TIMBER, THRESHOLDS, LINTELS, ETC.) |
| 4. WESTERN-STYLE FIXTURE LUMBER (FRAME SETS, WINDOW FRAMES, BASEBOARDS, WALL TRIMS, ETC.) | 13. SANITARY WARE (BATHS, DRESSING TABLES) |
| 5. FLOORING MATERIAL | 14. INTEGRATED KITCHEN SYSTEMS |
| 6. ENTRANCE-RELATED MEMBERS | 15. WALL MATERIALS (PANEL LONG, SPANDREL WALLS) |
| 7. STAIR MEMBERS (LVL STAIRS, LAMINATED STAIRS, TOP RAILS) | 16. SASHES |
| 8. STAIRCASE-RELATED MEMBERS (NEWEL POSTS, SMALL POSTS, HANDRAILS) | 17. OTHERS |
| 9. INTERIOR BOARDS | |

SELECT ALL        SKIP    GO

FIG. 15

SEARCH RESULTS SCREEN

SEARCH RESULTS

| INPUT: PRODUCT NAME | MEASUREMENT | LONG | WIDE | THICK | UNIT | QTY | UNIT | DISPLAYED PRODUCT NO. |
|---|---|---|---|---|---|---|---|---|
| FRAME SET FOR STORAGE DOUBLE DOORS – SOFT ART P SET | CB | 2016 | 734 | 105 | 1 | 1 | SET | AUQ141-P-F |
| LEFT-RIGHT STORAGE DOUBLE DOOR SET – S ART FLAT SET | CB | 1963 | 670 | 24 | 1 | 1 | | XAQ744-F |
| LAVATORY DOOR – S ART PANEL BR H-S PIECE | CB | 1980 | 594 | 36 | 1 | 1 | PIECE | CDQ11BR-BHS-F |
| DOOR FRAME SET – SOFT ART F SET | CB 812 | 2033 | 660 | 113 | 1 | 1 | SET | TDQ111-BF-F |
| CASING SET A FOR S ART SINGLE SET | CB | 2100 | 900 | 24 | 1 | 1 | SET | AGNQ41-A-F |
| FLOOR/WALL-MOUNT DOOR STOPPER PIECE | CB | 0 | 0 | 0 | 1 | 1 | | ZY0811 |
| LAVATORY DOOR – S ART PANEL BR H-S PIECE | CB | 1980 | 594 | 36 | 1 | 1 | PIECE | CDQ11BR-BHS-F |
| FLOOR/WALL-MOUNT DOOR STOPPER PIECE | CB | 0 | 0 | 0 | 1 | 1 | | ZY0811 |
| CASING SET A FOR S ART SINGLE SET | CB | 2100 | 900 | 24 | 1 | 1 | SET | AGNQ41-A-F |
| DOOR FRAME SET – SOFT ART F SET | CB 812 | 2033 | 660 | 113 | 1 | 1 | SET | TDQ111-BF-F |
| CASING SET A FOR S ART SINGLE SET | CB | 2100 | 300 | 24 | 1 | 1 | SET | AGNQ41-A-F |
| DOOR FRAME SET – SOFT ART F SET | CB 826.5 | 2033 | 796 | 113 | 1 | 1 | SET | TDQ114-BF-F |
| SINGLE DOOR – S ART PANEL BRC PIECE | CB | 1980 | 730 | 36 | 1 | 1 | PIECE | CDQ14BR-BC-F |
| FLOOR/WALL-MOUNT DOOR STOPPER PIECE | CB | 0 | 0 | 0 | 1 | 1 | | ZY0811 |
| CASING SET A FOR S ART SINGLE SET | CB | 2100 | 900 | 24 | 1 | 1 | SET | AGNQ41-A-F |
| SINGLE DOOR – S ART PANEL BRC PIECE | CB | 1980 | 730 | 36 | 1 | 1 | PIECE | CDQ1-4BR-BC-F |
| FLOOR/WALL-MOUNT DOOR STOPPER PIECE | CB | 0 | 0 | 0 | 1 | 1 | | ZY0811 |
| DOOR FRAME SET – SOFT ART F SET | CB 812 | 2033 | 796 | 113 | 1 | 1 | SET | TDQ114-BF-F |
| CASING SET A FOR S ART SINGLE SET | CB | 2100 | 2100 | 24 | 1 | 1 | SET | AGNQ43-A-F |
| FRAME V EXCLUSIVELY FOR S ART SLIDING SET | CB 1762 | 2033 | 1644 | 113 | 1 | 1 | SET | NHQ146-V-F |
| WESTERN-WESTERN SLIDING DOOR – S ART PANEL BRM PIECE | CB | 1980 | 848 | 30 | 1 | 1 | PIECE | KVQ16BR-BA-F |
| FRAME FOR STORAGE DOUBLE DOOR SET SOFT ART P SET | CB | 1188 | 734 | 105 | 1 | 1 | SET | AUQ121-P-F |
| LEFT-RIGHT STORAGE DOUBLE DOOR SET – S ART FLAT SET | CB | 1135 | 670 | 24 | 1 | 1 | | XAQ444-F |
| CASING SET A FOR S ART SLIDING SET | CB | 2100 | 2100 | 24 | 1 | 1 | SET | AGNQ43-A-F |
| CASING SET A FOR S ART SLIDING SET | CB | 2100 | 2100 | 24 | 1 | 1 | SET | AGNQ43-A-F |
| WESTERN-WESTERN SLIDING DOOR – S ART PANEL BRM PIECE | CB | 1980 | 580 | 30 | 1 | 1 | PIECE | KVQ11BR-RV-F |
| FRAME 807RV EXCLUSIVELY FOR SLIDING DOOR SET | CB 1762 | 2033 | 1644 | 113 | 1 | 1 | SET | NKQ145-RV-F |
| WESTERN-WESTERN SLIDING DOOR – S ART PANEL BRA PIECE | CB | 1980 | 807 | 30 | 1 | 1 | PIECE | KVQ15BR-BA-F |

VIEW STAIRCASE-RELATED MEMBERS

DETAIL QUOTATION SCREEN

[RETURN]

SITE NAME: @

(DETAIL QUOTATION)

QUOTATION NO. 8666007303  PAGE 1/6

| LINE NO. | DESIGN | UNIT PRICE SIZE m/m | PRODUCT NAME SPECIFICATIONS | | QTY. NO. SOLD | UNIT SALE MULTIPLY DIVIDE | UNIT PRICE (UNIT PRICE) | SALE PRICE DISCOUNT | DESIGN PRICE | TOTAL PRICE (TOTAL) | J CODE | REMARKS | CATALOG ORDER STATUS |
|---|---|---|---|---|---|---|---|---|---|---|---|---|---|
| FIRST FLOOR | JOINERY | | | | | | | | | | | | |
| 1 | DK | XAQ744-☐ 1963: 670:24.0 | LEFT-RIGHT STORAGE DOUBLE DOOR SET - S/ART FLAT | CB | 1:SET | | | | ¥32,700 | ¥32,700 | | | P449 |
| 2 | | AUQ141-P-☐ 2016: 734:105.0 | FRAME SET FOR STORAGE DOUBLE DOORS - S/CF/ART P. FIXED FRAME MODEL-105 | CB | 1:SET | | | | ¥17,200 | ¥17,200 | | | P449 |
| 3 | LAVATORY | CDQ11BR-BHS-☐ 1980: 594:36.0 | LAVATORY DOOR - S/ART PANEL BRHS WITH PARTITIONING LOCK/LIGHT SCOPE | CB | 1:PIECE | | | | ¥38,000 | ¥38,000 | | | P384 |
| 4 | | CDQ11BR-BHS-☐ 1980: 594:36.0 | LAVATORY DOOR - S/ART PANEL BRHS WITH PARTITIONING LOCK/LIGHT SCOPE | CB | 1:PIECE | | | | ¥38,000 | ¥38,000 | | | P384 |
| 5 | | TDQ111-BF-☐ 2033: 668:113.0 | DOOR FRAME SET - S/ART ART F WITH ADJUSTABLE FRAME AND SILL F(RESIN) | CB | 1:SET | | | | ¥17,000 | ¥17,000 | | | P387 |
| 6 | | TDQ111-BF-☐ 2033: 660:113.0 | DOOR FRAME SET - S/ART ART F WITH ADJUSTABLE FRAME AND SILL F(RESIN) | CB | 1:SET | | | | ¥17,000 | ¥17,000 | | | P387 |
| 7 | | AGNQ-41-A-☐ 2100: 900:24.0 | CASING SET AFOR S/ART SANDAL | CB | 1:SET | | | | ¥7,000 | ¥7,000 | | | P391 |
| 8 | | AGNQ-41-A-☐ 2100: 900:24.0 | CASING SET AFOR S/ART SANDAL | CB | 1:SET | | | | ¥7,000 | ¥7,000 | | | P391 |
| 9 | HALL | CDQ149R-RC-☐ 1980: 730:36.0 | SINGLE DOOR - S/ART PANEL BRC LATCH | CB | 1:PIECE | | | | ¥38,000 | ¥38,000 | | | P378 |
| 10 | | CDQ148R-RC-☐ 1980: 730:36.0 | SINGLE DOOR - S/ART PANEL BRC LATCH | CB | 1:PIECE | | | | ¥38,000 | ¥38,000 | | | P378 |
| 11 | | TDQ114-BF-☐ 2033: 796:113.0 | DOOR FRAME SET - S/ART ART F WITH ADJUSTABLE FRAME AND SILL F(RESIN) | CB | 1:SET | | | | ¥17,000 | ¥17,000 | | | P381 |
| 12 | | TDQ114-BF-☐ 2033: 796:113.0 | DOOR FRAME SET - S/ART ART F WITH ADJUSTABLE FRAME AND SILL F(RESIN) | CB | 1:SET | | | | ¥17,000 | ¥17,000 | | | P381 |
| 13 | | AGNQ-41-A-☐ 2100: 900:24.0 | CASING SET AFOR S/ART SANDAL | CB | 1:SET | | | | ¥7,000 | ¥7,000 | | | P391 |
| 15 | | AGNQ-41-A-☐ 2100: 900:24.0 | CASING SET AFOR S/ART SANDAL | CB | 1:SET | | | | ¥7,000 | ¥7,000 | | | P391 |

FIG. 19
AN EXAMPLE OF A HOME PAGE CREATED AUTOMATICALLY
XX'S RESIDENCE ORIGINAL PLAN HOME PAGE
HEALTHY AND SAFE
OFFERINGS OF JUPINO SERIES
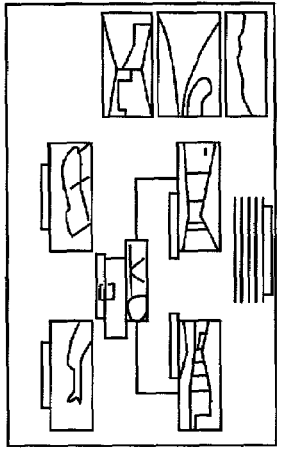
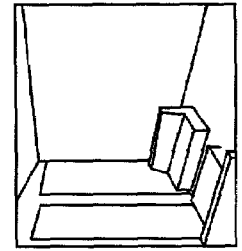
OFFERINGS OF SPANDREL WALLS
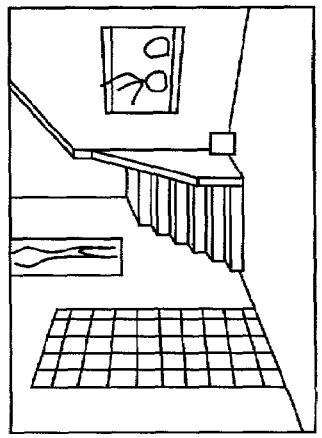
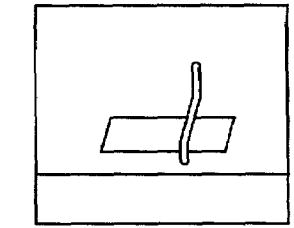

PRODUCT ORDERING METHOD AND SYSTEM

BACKGROUND OF THE INVENTION

1. Field of the Invention

This invention relates to a product ordering method and system, and more particularly to a product ordering method and system which handles order processing of products such as building materials between a supplier such as a building material manufacturer and purchasers such as construction contractors and allows customers to specify products online or via the Internet using drawings prepared by CAD.

2. Description of the Related Art

Each building material manufacturer routinely deals building materials with a large number of customers including distributors such as wholesalers and construction contractors such as building contractor's offices. For normal home building, customers have to order wide-ranging types and sizes of building material while building material manufacturers maintain huge quantities of building materials with different part numbers. Consequently, both customers and building material manufacturers are forced to carry a large workload when preparing quotations and processing orders. To reduce such workload when placing and receiving orders, some building material manufacturers have come to use order processing systems which can receive orders in the form of architectural CAD drawings—floor plans in which part numbers of building materials are entered directly—and prepare quotation data automatically from the CAD drawings.

When using a conventional order processing system to quote prices automatically for order placements and receipts, the work of a building material manufacturer is divided into four stages: obtaining drawings for quotation, setting conditions for quotation, preparing a quotation, and creating a presentation. A concrete example is shown below.

1. Stage of Obtaining Drawings for Quotation 1-1. A request for quotation for housing materials is received from a construction contractor such as a building contractor's office.

1-2. Either a sales person goes to a customer site to pick up CAD drawings (in paper form) of an object to be quoted or the customer is asked to fax the drawings.

1-3. Regarding the drawings, points that need care as well as uncertainties about a fit are clarified orally or by phone.

2. Stage of setting conditions for quotation 2-1. The shape of a building and conditions for quotation are checked by a sales person who visits the customer or by phone.

2-1-1. Shape of Building

Construction method: Wood-frame construction, 2×4 modules 910, 955, 1000, etc.

Wall thickness: 130, 145, 160, 105, etc.

Height of stories, joinery, windows, handrails, walls, etc.

2-1-2. Conditions for Quotation

Items covered: Joinery, fixture lumber, floors, staircase, wall paper, exterior wall material, curtains, planting, structural material and the like, product series and the like, and product design and the like.

3. Stage of Quotation 3-1. With a typical order processing system, CAD drawings are opened and parts with established parts numbers are manually laid out directly to the locations on the drawings which correspond to the actual locations where these products will be placed actually.

3-2. The system automatically counts the parts laid out on the CAD drawings and calculates the quantity for each part number.

3-3. The system searches a product catalog file by the product number, extracts price and other detailed information, and prepares quotation data.

When an order processing system is not used or when prices are quoted for products which are not supported, calculation is carried out as follows.

3-3-1. <Example 1: Doors>

Shapes of doors such as single swinging, single sliding, and two-leaf doors are checked on the drawings. The rooms on both sides of each door are checked in order to select among a glass door, panel door, lavatory door, Japanese-style door, and Western-style door. Door width and frame width are determined by calculating the opening size from information about modules, wall thickness, and inside corners. Desired parts numbers are searched for in catalogs, based on specified kinds of wood, designs, and colors.

3-3-2. <Example 2: Fixture Lumber and Floors>

Layouts are checked on the drawings. Products are searched for in catalogs.

The total length is divided by the length of a single unit to determine the quantity of the product.

4. Stage of Creating a Presentation

A presentation board and miniature house (model of a house) are created. A presentation board consists of images of building materials laid out around a floor plan and connected by means of leader lines to the places where they are used. A miniature house is a model of a house which is assembled from thin foamed plastic boards. Paper patterns with images of building materials printed are labeled on the wall and floor surfaces where the building materials will be used (see, for example, Japanese Patent Laid-Open 2000-56677).

4-1. Drawing data is captured into presentation board creation software and pasted.

4-2. Image data of each product to be quoted is searched for by the presentation board creation software and pasted to the presentation board on screen.

4-3. The quoted parts are indicated by leader lines on the presentation board on the screen.

4-4. A catch phrase for each product is pasted to the presentation board on the screen.

4-5. The presentation board is printed out on a color printer and is sent or hand-delivered to the customer.

4-6. Similarly, to create a miniature house, image data is captured into miniature house paper pattern creation software; elevational paper patterns of wall surfaces are created, printed out, and pasted to foamed plastic boards; and the miniature house is assembled.

Conventional online order processing systems, which do practically nothing but create quotation data, do not make full use of image data and thus present the following problems.

Specifically, if CAD drawings in a request for quotation are faxed or handed only in paper form, human intervention is necessary. Also, the original CAD data of the drawings is not delivered and thus is not available.

If drawings are received in paper form without DAD data, it is often the case that they are copied or faxed repeatedly in the process, resulting in indistinct copies. This in turn may necessitate telephone inquiries or cause errors.

Also, drawings without DAD data increases the possibility of leaving uncertainties or making mistakes.

Furthermore, since part numbers and parts are laid out on CAD drawings conventionally, if the customer wants items to be upgraded and quoted again or if the manufacturer adds or deletes items, modifications are required to rearrange parts on the drawings on CAD.

Also, if part numbers and parts are entered in CAD drawings, it is necessary to update the part library of the CAD system each time a new product is released or an existing product goes out of production.

Also, manual quotations without CAD data depend largely on skills of individuals, increasing the possibility of omissions, input errors in quantity, or calculation errors in size.

Furthermore, during preparation of a presentation board, since images, arrows, and captions are laid out manually, the results vary with the skill of the author.

Also, since photographs of products are laid out in a limited space, there is a limit to what a presentation board can express. Besides, Typical home pages of building material manufacturers contain a lot of information unnecessary for customers, making it difficult to obtain necessary product information efficiently.

SUMMARY OF THE INVENTION

To solve the above problems, the present invention ensures that the drawings attached to an order and passed from a purchaser to a supplier be sent via a network and that the information about products specified in the drawings be limited to basic specifications less subject to disuse and revision of part numbers. However, this might cause a lack of information about the product specifications, which would make it difficult to identify past numbers. To avoid that and allow part numbers of products to be identified, past trends of each customer in detail specifications of products are registered in advance as customer planning information and are used to supplement the basic information of the drawings.

Also, when creating quotation data, the present invention automatically creates presentation boards and miniature houses for customers by using internal data and opens customer-specific home pages to allow the customers to view necessary information easily at any time.

The present invention provides a product ordering method to place and receive orders for products between a terminal of a purchaser and a host computer of a supplier connected via a network. The method comprises sending from the terminals to the host computer CAD drawing data which contains basic specifications of products ordered by a customer, managing in the host computer product catalog information including price information of products for which orders can be accepted and customer planning information in which planning information of each customer about detail specifications of products has been registered, receiving the CAD drawing data sent from the terminal, extracting the basic specifications of the ordered products from the CAD drawing data, searching the product catalog information using the extracted basic specifications of the ordered products and the customer planning information, creating quotation data based on retrieved product catalog information, and sending the quotation data to the terminal.

Preferably, in the above described product ordering method, the host computer automatically creates a presentation board and/or miniature house based on the CAD drawing data of the ordered products and quotation data of the ordered products.

Preferably, in the above described product ordering method, the network is the Internet.

Preferably, in the above described product ordering method, the host computer generates a dedicated home page for each order from the customer and makes any information related to the ordered product available for viewing.

Preferably, in the above described product ordering method, the customer is permitted to view the home page when the customer enters a password assigned to the customer.

The present invention provides a product ordering system to place and receive orders for products between a terminal of a purchaser and a host computer of a supplier connected via a network. The system comprises a quotation preparation means for receiving CAD drawing data which is sent from any of the terminals and contains specifications of products ordered by a customer and creating quotation data with reference to product catalog information, and presentation and home page creation means for creating a presentation board and/or miniature house as well as home page for the customer using the CAD drawing data and quotation data.

Preferably, in the above described product ordering system, the CAD drawing data sent from the terminal contains only basic specifications of the products, the quotation preparation means creates quotation data by searching the product catalog information based on the extracted basic specifications of the ordered products and on the customer planning information which contains detailed product specifications registered for each customer in advance.

Preferably, in the above described product ordering system, the customer is permitted to view the home page when the customer enters a password assigned to the customer.

Preferably, in the above described product ordering system, the password has been printed on the presentation board given to the customer.

The product ordering method and system of the present invention provide the following advantages.

By capturing CAD data, the present invention can automate preparation of quotations and speed up order processing.

By separating product information such as product grades from CAD data and treating as planning information, the present invention allows multiple sets of quotation data different in grade to be created from the same CAD data and allows the customer to compare and weigh them easily.

By integrating a quotation system and presentation board and miniature house creation system, the present invention can avoid waste such as redundant data entry.

By posting the progress of construction work together with photographs on a customer-specific home page, the present invention can share process control information with the customer (owner).

By creating customer-specific home pages automatically and linking them with presentations, the present invention can approach customers directly.

By allowing builders to inquire about products, propose upgrades, propose products not included in a quotation, and so forth easily on the home page, the present invention can assist builders.

BRIEF DESCRIPTION OF THE DRAWINGS

FIG. 5 is diagram showing an example of exploded CAD data.

FIG. 6 is diagram showing an example of data obtained from quotation condition settings.

FIG. 7 is diagram showing an example of data obtained from building information.

FIG. 8 is diagram showing logic for searching for product numbers using a search key prepared from a combination of data obtained in FIGS. 5 to 7.

FIG. 9 is a diagram showing a screen for specifying basic information about a building including a construction method such as wooden or steel, a module, and a type of wall structure.

FIG. 13 is a diagram showing a screen for specifying items to be added up in a quotation.

FIG. 15 is a diagram showing a search results screen.

FIG. 16 is a diagram illustrating a quotation output specification screen.

FIG. 17 is a diagram showing a detail quotation screen.

FIG. 19 is a diagram showing a home page created automatically.

DETAILED DESCRIPTION OF THE PREFERRED EMBODIMENTS

Figure 1:
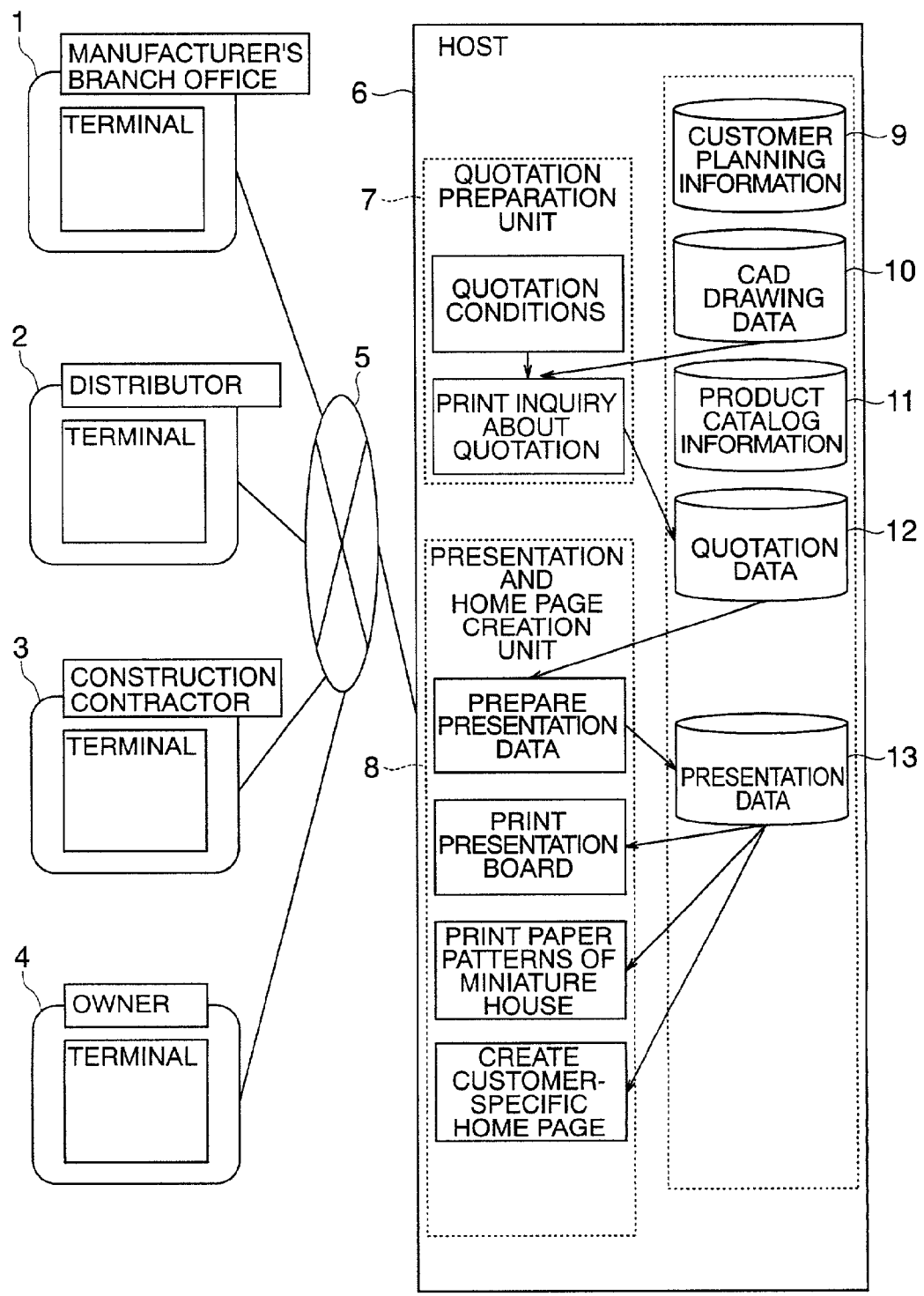
FIG. 1 is a basic block diagram of a system according to the present invention shown in an exemplary manner.

FIG. 1 is a basic block diagram of a system according to the present invention shown in an exemplary manner.

In FIG. 1, a terminal 1 at a branch office of a product manufacturer, a terminal 2 of a distributor such as a wholesaler, a terminal 3 of a construction contractor, a terminal 4 of an owner, and a host computer 6 of a product manufacturer are interconnected via various lines for going online and a network 5 such as the Internet. The host computer 6 includes an order processing server of the product manufacturer. The host computer (server) 6 comprises a quotation preparation means 7, a presentation and home page creation means 8, customer planning information 9 for determining detail specifications of products for each customer registered in advance, CAD drawing data 10 received from the terminal 3 or the like, catalog information 11 of stock products, prepared quotation data 12, and prepared presentation data 13. The quotation preparation means 7 prepares the quotation data 12 based mainly on the CAD drawing data 10. The presentation and home page creation means 8 prepares the presentation data 13 based mainly on the quotation data 12. The presentation data 13 is output in various forms.

Figure 2:
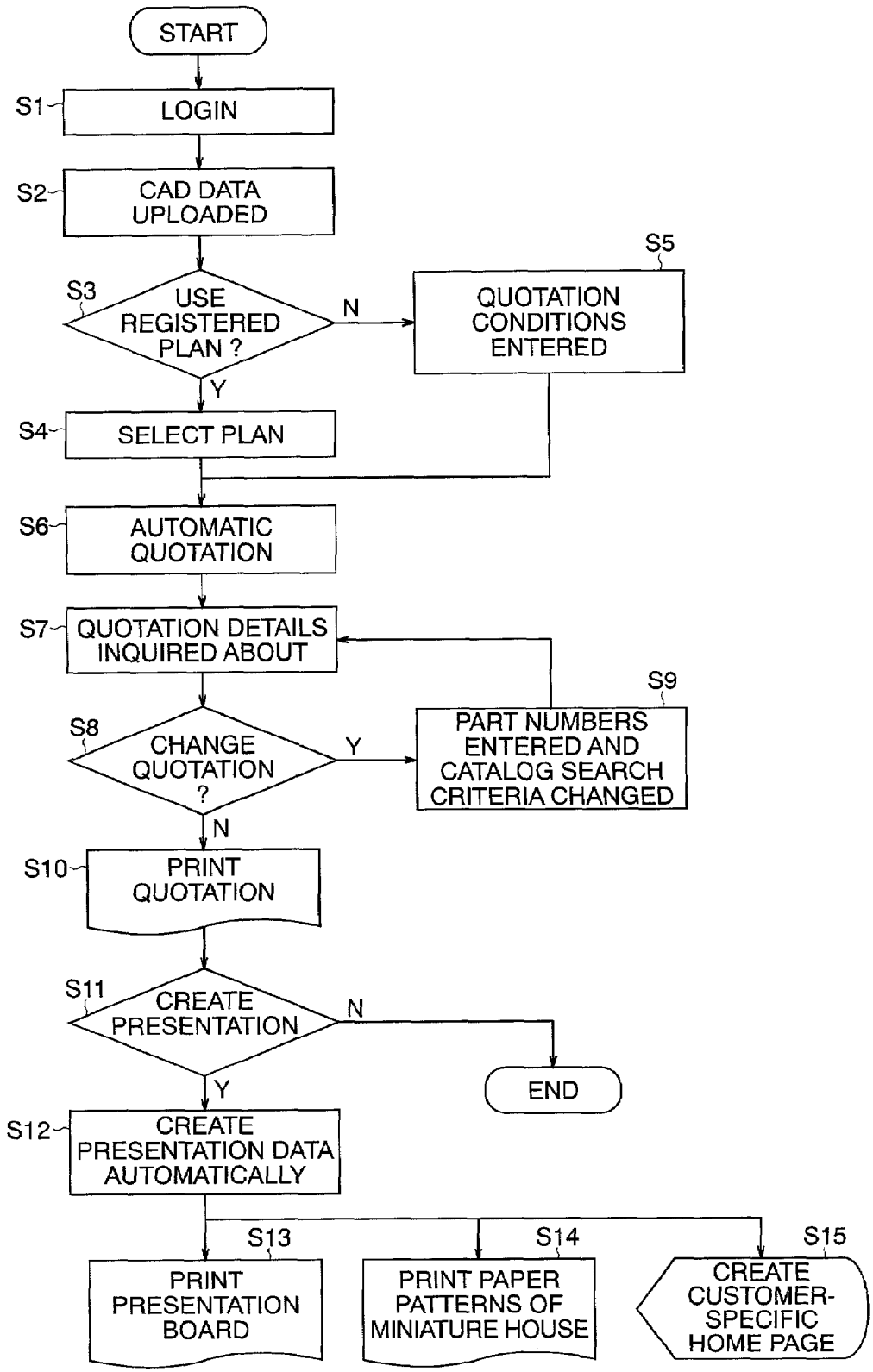
FIG. 2 is diagram showing a flow of order processing operations according to the system of the present invention.

FIG. 2 shows a flow of order processing operations according to the system of the present invention. Procedures for the operations shown in FIG. 2 will be described below with reference to FIG. 1. It is assumed here that product orders are placed through the construction contractor's terminal 3.

The terminal 3 logs in to the host computer 6 via the network 5 (Step S1), starts up the quotation preparation means 7 by making a request for quotation, and uploads CAD drawing data 10 to the host computer 6 (Step S2). The uploaded CAD drawing data 10 is a floor plan (sketched plan view), for example. It contains broad specifications for doors, window frames, and building materials such as interior materials, but detailed specifications such as designs or detail dimensions are not provided. The customer planning information 9 contains trends in detail specifications of products registered as plans based on customer-by-customer past order records and arrangements records.

The terminal 3 (i.e., the user at the terminal 3) determines whether to use a plan registered in the customer planning information 9 and sends the result as an instruction to the host computer 6 (Step S3). If a plan is to be used, the quotation preparation means 7 selects an appropriate plan, supplements the product specifications in the CAD drawing data 10 with it, determines the part numbers of the ordered products by searching the product catalog information 11 (Step S4), and prepares quotation data 12 based on the above data (Step S6). If no appropriate plan is available, the quotation preparation means 7 sends a message to the terminal 3 to enter additional quotation conditions. When the terminal 3 enters necessary quotation conditions (Step S5), the quotation preparation means 7 obtains product prices and other detailed information by searching the product catalog information, and prepares quotation data 12 (Step S6).

Then, as the terminal 3 inquires about detailed results of the quotation (Step S7) and the host computer 6 displays the results, the terminal 3 (user) judges based on these results whether the quotation needs modifications and sends the result of the judgment as an instruction to the host computer 6 (Step S8). If the quotation is unsatisfactory (needs modifications), the terminal 3 changes catalog search criteria (Step S9) and performs Step S7. In response, the quotation preparation means 7 prepares a quotation again. If the quotation is satisfactory (needs no modification), the quotation preparation means 7 prints it out (Step S10).

Then, the terminal 3 (user) determines whether to create a presentation and sends the result as an instruction to the host computer 6 (Step S11). If no presentation is to be created, the processing is finished. If a presentation is to be created, the presentation and home page creation means 8 starts up and prepares presentation data 13 based on the CAD drawing data 10 and quotation data 12 (Step S12). Then, based on the presentation data 13, the presentation and home page creation means 8 prints a presentation board 13 (Step S13) and paper patterns for a miniature house (Step S14) as well as creates a customer-specific home page (Step S15).

Now, a preferred embodiment of the present invention will be described below.

Figure 3:
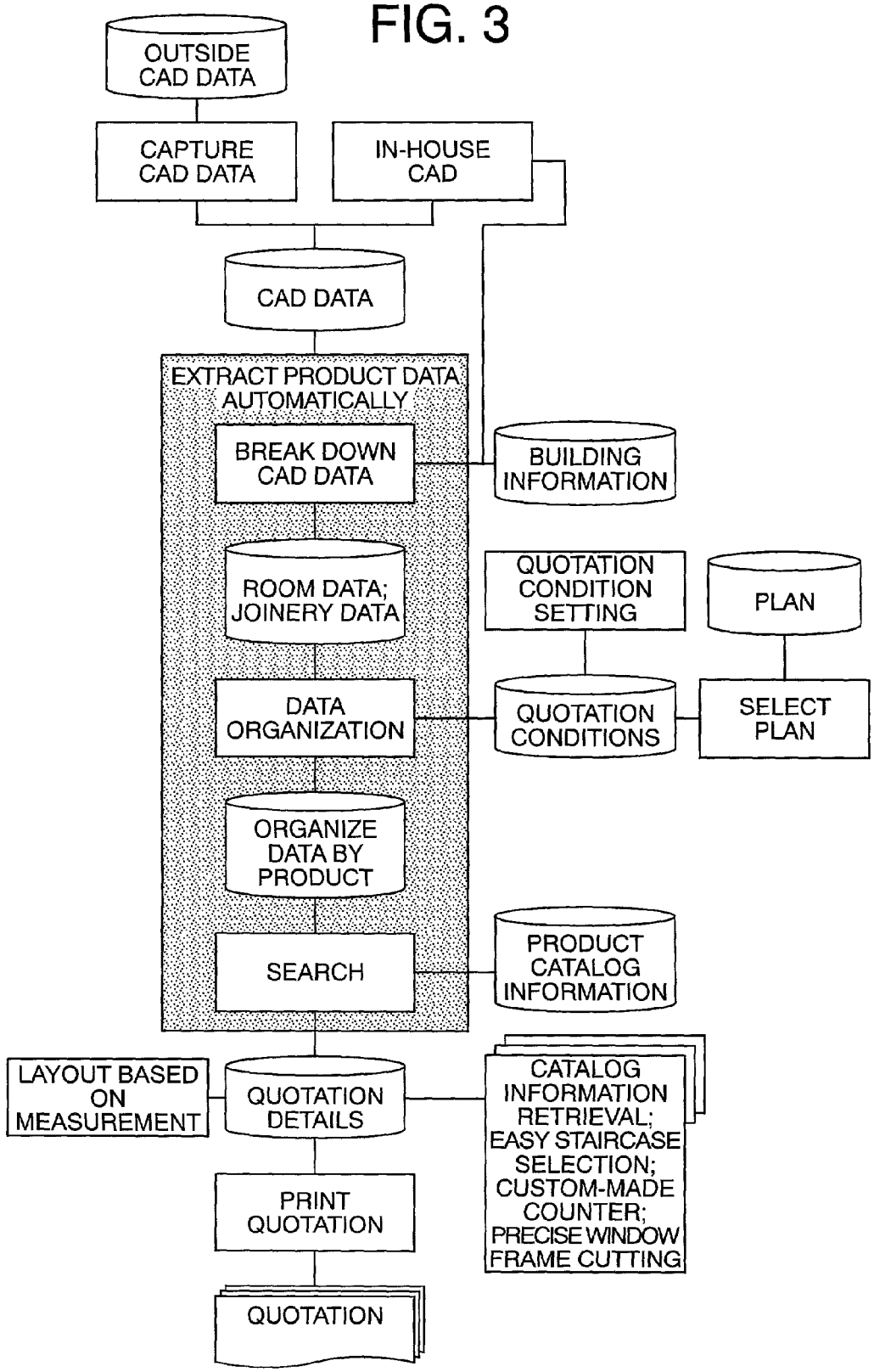
FIG. 3 is diagram showing a process flow of quotation preparation carried out by a quotation preparation means shown in FIG. 1.

FIG. 3 is diagram showing a process flow of quotation preparation carried out by the quotation preparation means 7 of FIG. 1.

Drawings for order from the customer is captured in CAD data format via a network or using a recording medium such as the CD-ROM, floppy disk, Zip disk, or the like. Data from outside CAD systems is converted into a format compatible with in-house CAD systems. Data about ordered products is extracted automatically from the CAD data captured in this way.

First, with reference to basic information about the overall building, the quotation preparation means 7 breaks down the CAD data into room data, joinery data, etc. according to types of housing component. It extracts ordered products from the exploded data and analyzes their specifications. It organizes the data by making up for any insufficiency in the specifications with reference to the quotation conditions specified in the customer-specific plan. Then, it classifies the organized data by the product, searches product catalog information by the product, extracts prices and other detailed product information of individual products, and prepares quotation detail data based on the extracted information. In doing that, the quotation preparation means 7 specifies a staircase, a counter, window frames, and whatever possible according to quotation conditions to be custom-made or semi-finished and specifies layout based on measurement. Then, it prints out a written quotation according to the quotation detail data.

Figure 4:
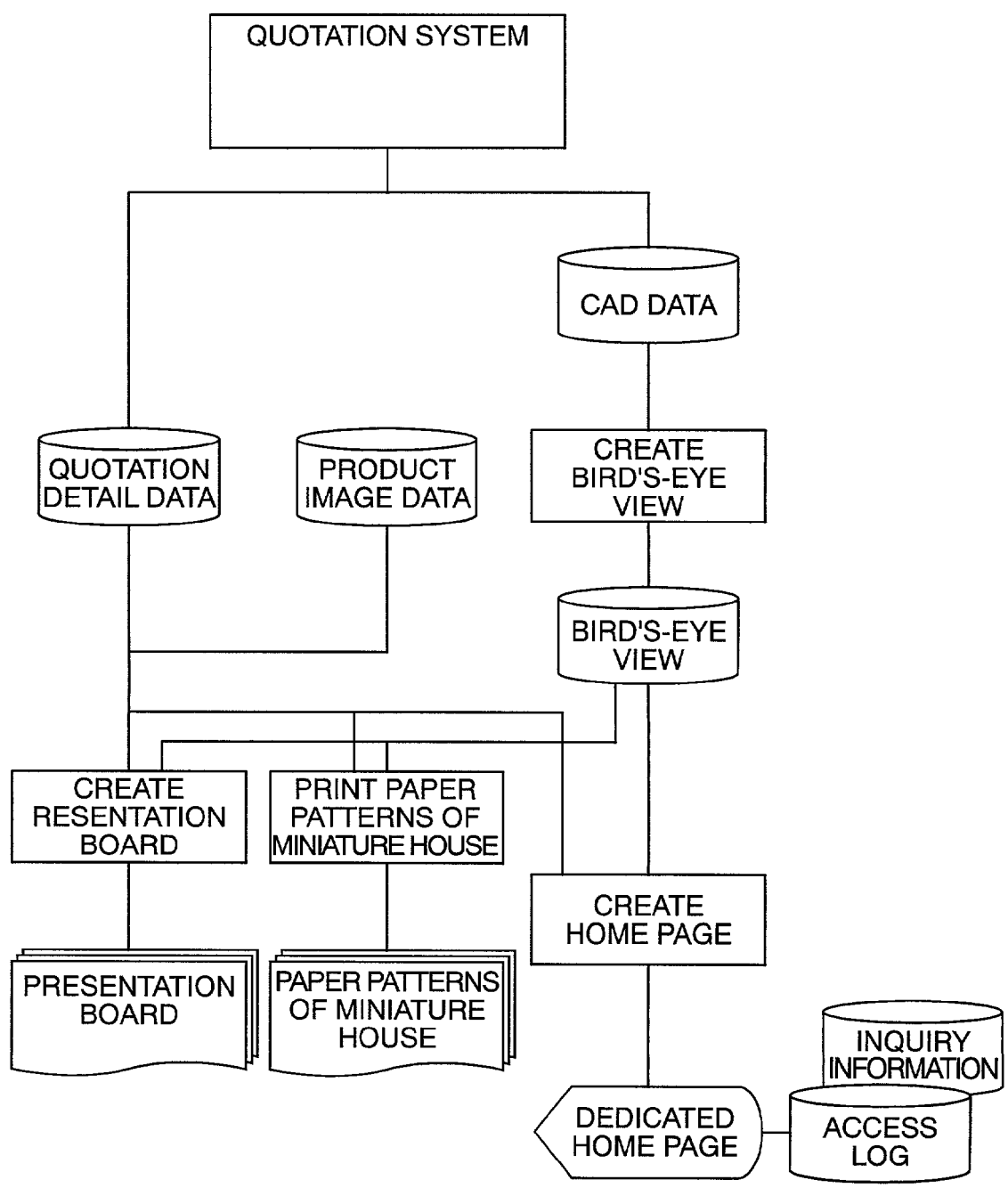
FIG. 4 is diagram showing a flow of home page creation.

FIG. 4 is diagram showing a flow of processing for creating a presentation board, paper patterns of a miniature house, and a home page performed by the presentation and home page creation means 8 shown in FIG. 1. This processing uses the data obtained in the quotation preparation process in FIG. 3: the CAD data, product image data contained in the product information, and quotation detail data.

First, the presentation and home page creation means 8 creates, from the CAD data, a bird's-eye view which represents a stereographic image of the house to be built. Then, it creates a presentation board using the data of the bird's-eye view, product data—part numbers, sizes, places of use—contained in the quotation detail data, and image data of the products with the corresponding part numbers. Also, it lays out and prints out paper patterns for a miniature house by determining the sizes, locations, and product image data of wall and floor surfaces in the house from the above data.

Customer-specific homepages are created in such a way as to allow customers to refer to various information they are interested in, including a bird's-eye view serving as a rendering of the building as well as the types, layout, quotation details, delivery dates, etc. of ordered building material. The basic format of the home pages are common to all customers, but it is also possible to allow the customers to select from two or more formats. The home pages and necessary data created are passed to Internet WWW servers and operated by them.

Only a password-authenticated user is authorized to access a customer-specific home page. The password is created and printed together with a presentation board and passed to the customer, who is thereby informed of it. Each home page access is logged and inquiry information is recorded. The access log and inquiry information are used for home page design. Also, they provide useful information to the order processing system and business operations.

FIGS. 5 to 8 shows concrete examples of automatic extraction of product data in the quotation preparation process in FIG. 3.

FIG. 5 shows an example of exploded CAD data. The system searches for items of joinery and calculates their shapes. In the case of a door, the system judges whether it is a single swinging door, a two-leaf door, a single sliding door, or double doors. Then, the system calculates the shapes of the rooms—Western-style, Japanese-style, living, lavatory, and corridor—on both sides of the joinery. Based on the combination of the rooms, the system determines the type of door: a panel door, glass door, or the like. Furthermore, the system calculates the size outside the frame from the shape of both sides of the door frame. In the case of a single door, for example, a predetermined formula is used depending on whether there are a single inside corner, two inside corners, or two wings around the door.

FIG. 6 shows an example of data obtained from quotation condition settings. The information extracted here include information about product series, color, design, the type of lever, the shape of a sill, and the shape of a frame.

FIG. 7 shows an example of data obtained from building information. The system identifies whether the overall building is of a conventional construction, two-by-four construction, or steel-frame construction and calculates wall thicknesses.

FIG. 8 shows logic for searching for product numbers using a search key prepared from a combination of data obtained in FIGS. 5 to 7. It is showing examples of search keys for frames, doors, and casings.

FIGS. 9 to 18 show examples of operating screens of the order processing system.

FIG. 9 shows a screen for specifying basic information about a building including its construction method such as wooden or steel, module, and type of wall structure.

Figure 10:
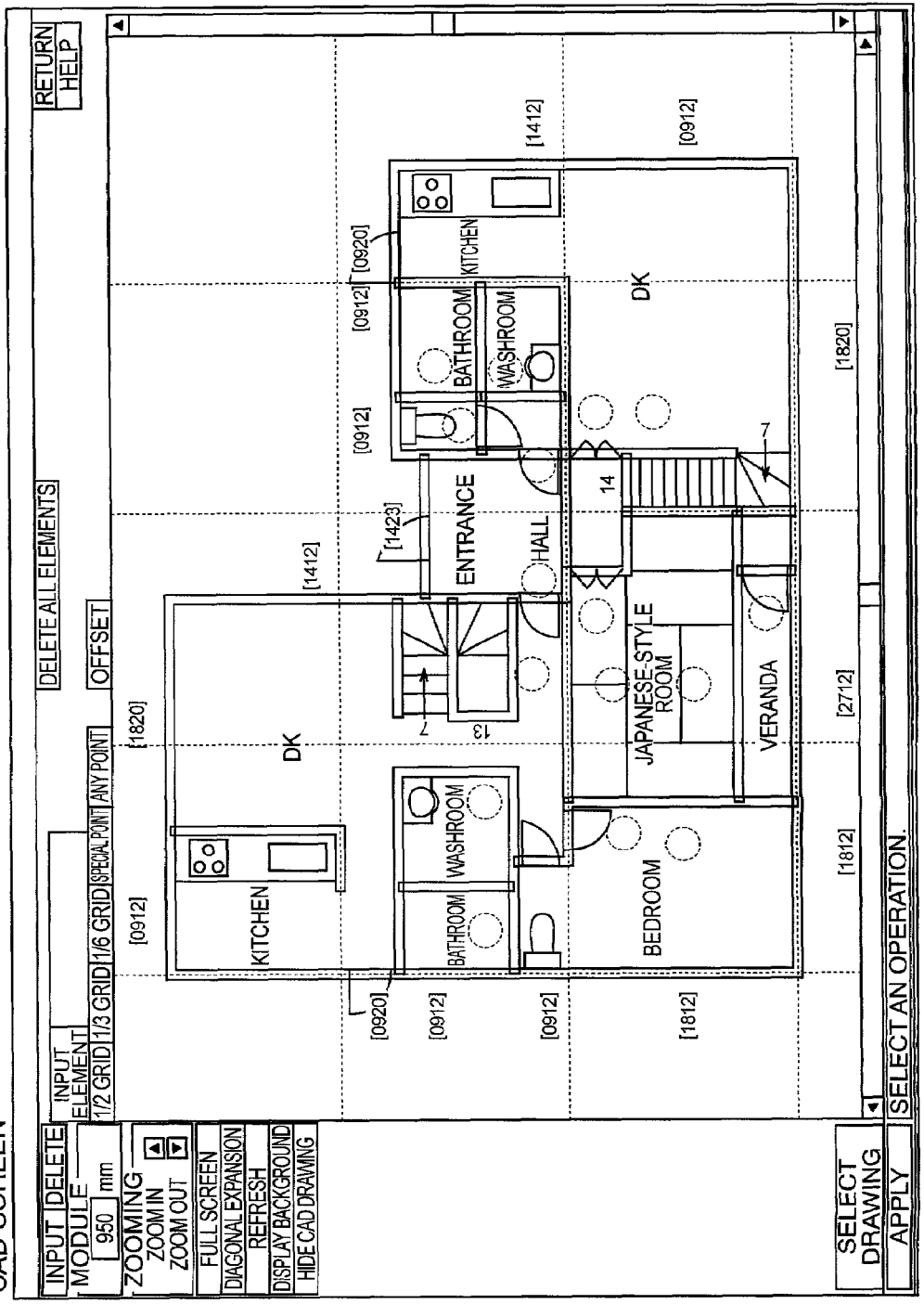
FIG. 10 is a diagram illustrating a display screen for CAD drawings.

FIG. 10 shows a display screen for CAD drawings. It is showing a captured CAD drawing data. For joinery, basic specifications are entered. In the case of a door, for example, its type such as single swinging or single sliding, heel post, swinging direction, etc. are entered.

Figure 11:
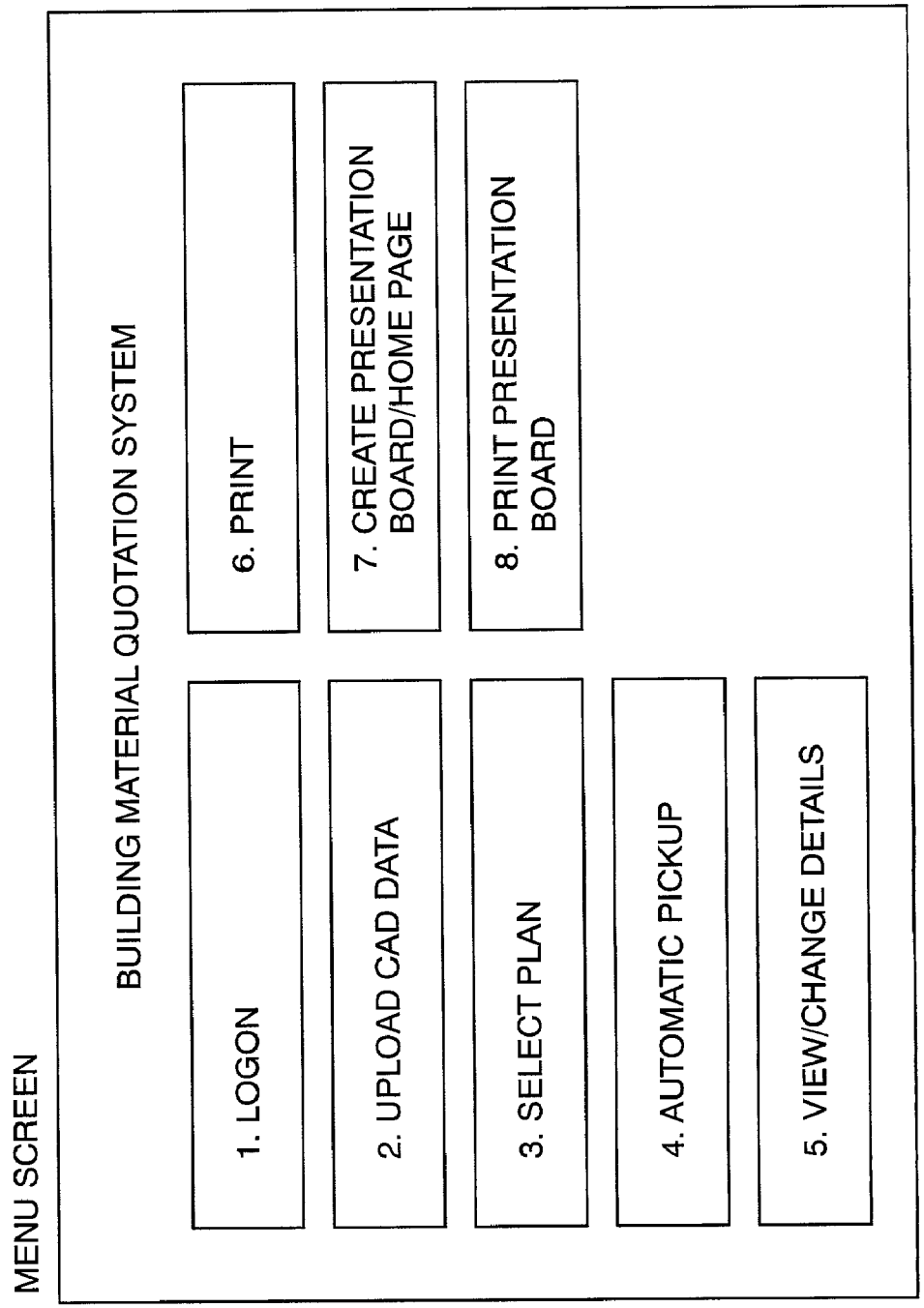
FIG. 11 is a diagram illustrating a menu screen on the terminal side of the system.

FIG. 11 shows a menu screen on the terminal side of the system. For example, reference numeral 1 denotes a button for logging on to the host computer server via the Internet, 2 denotes a button for requesting permission to upload CAD drawing data associated with a customer order to the server, 3 denotes a plan selection button for adding quotation conditions when searching a product catalog, 4 denotes a button for requesting the system to automatically extract ("pickup" in the figure) product data from CAD data.

Figure 12:
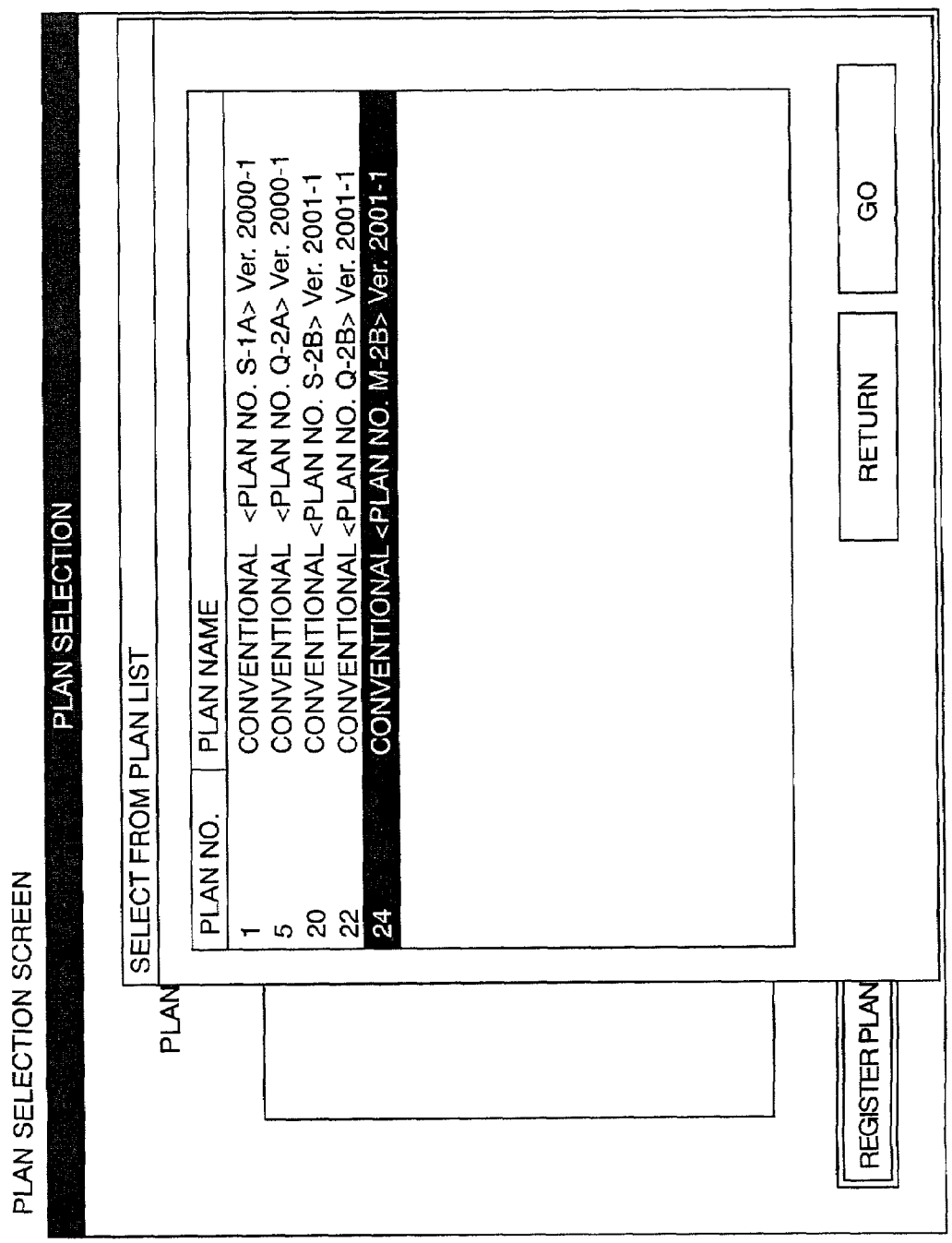
FIG. 12 is a diagram illustrating a plan selection screen.

FIG. 12 shows a plan selection screen, which displays a list of registered plans when the plan selection button 3 in the menu screen is pressed. When the user selects a desired plan and clicks an "Apply" button, the catalog is searched using the plan.

FIG. 13 shows a screen for specifying items to be added up in a quotation. Members 1 to 8 have been selected in the figure. They are extracted from the CAD data and searched for in the catalog.

Figure 14:
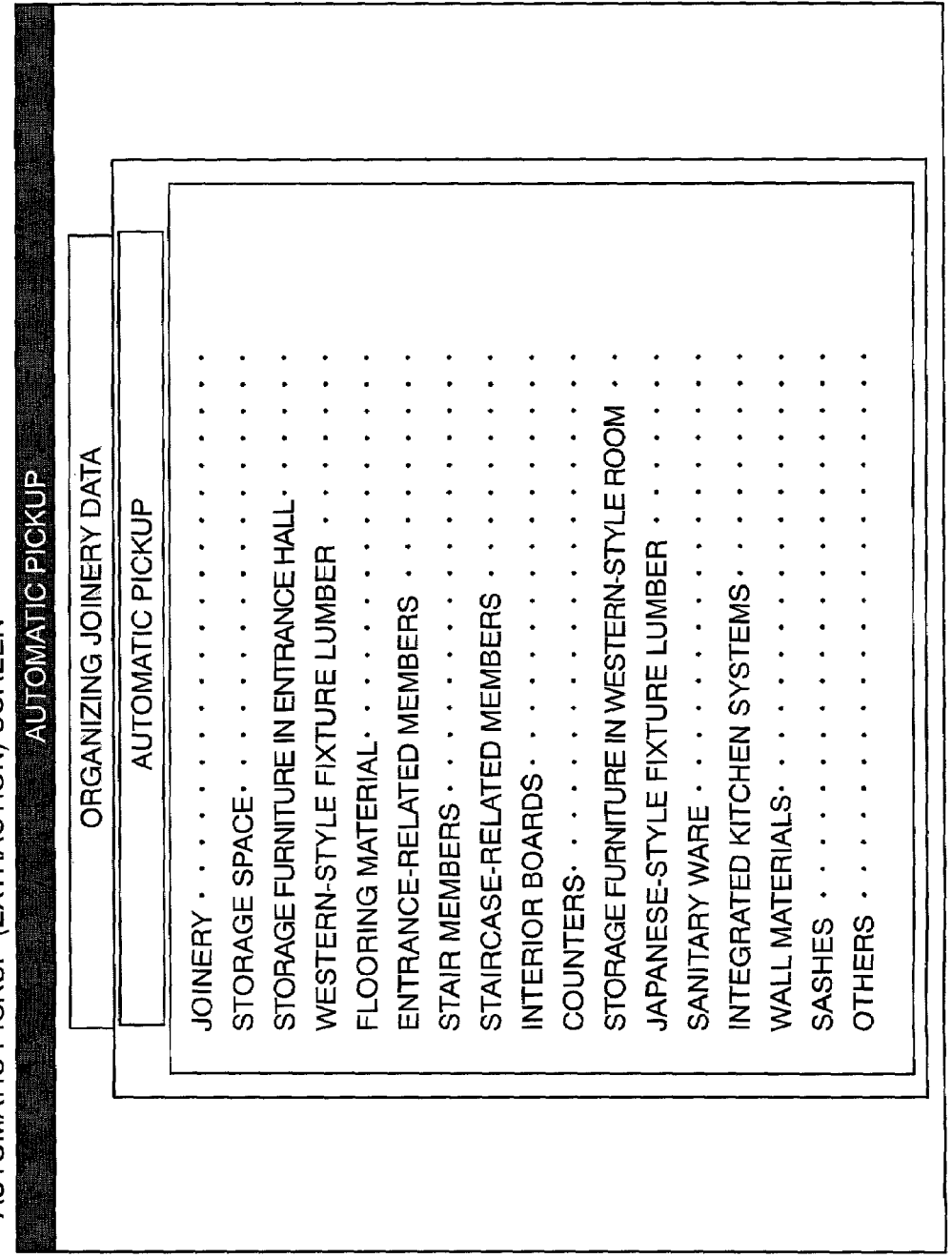
FIG. 14 is a diagram showing an automatic pickup (extraction) screen.

FIG. 14 shows an automatic pickup (extraction) screen. It shows the progress of extraction.

FIG. 15 shows a search results screen. It displays detailed information of the products searched for and retrieved based on the extracted data.

Figure 16:
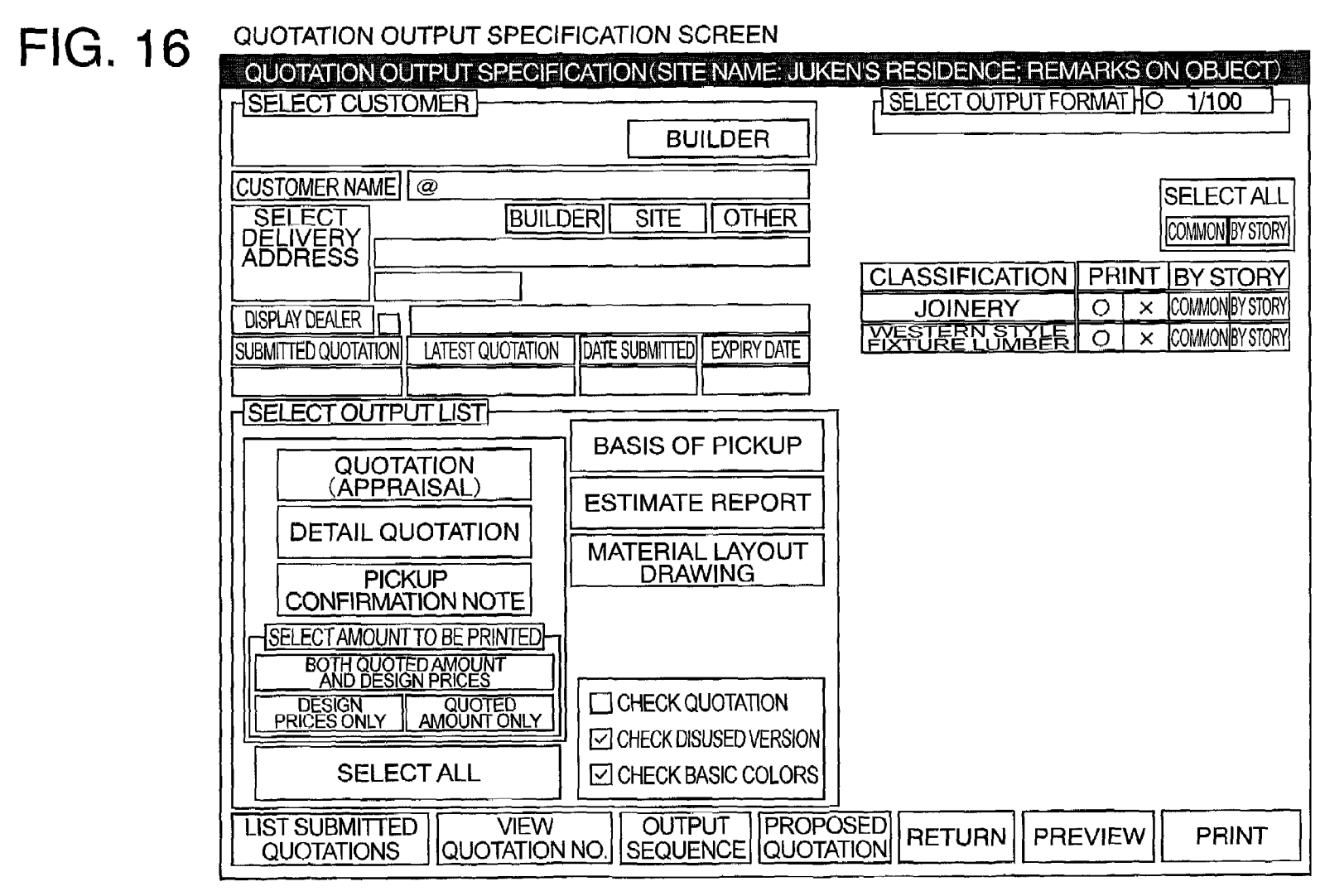

FIG. 16 shows a quotation output specification screen. It allows the user to specify whether to attach a pickup confirmation note and the like to a written quotation to be output, to help check the validity of the quotation.

FIG. 17 shows a detail quotation screen.

Figure 18:
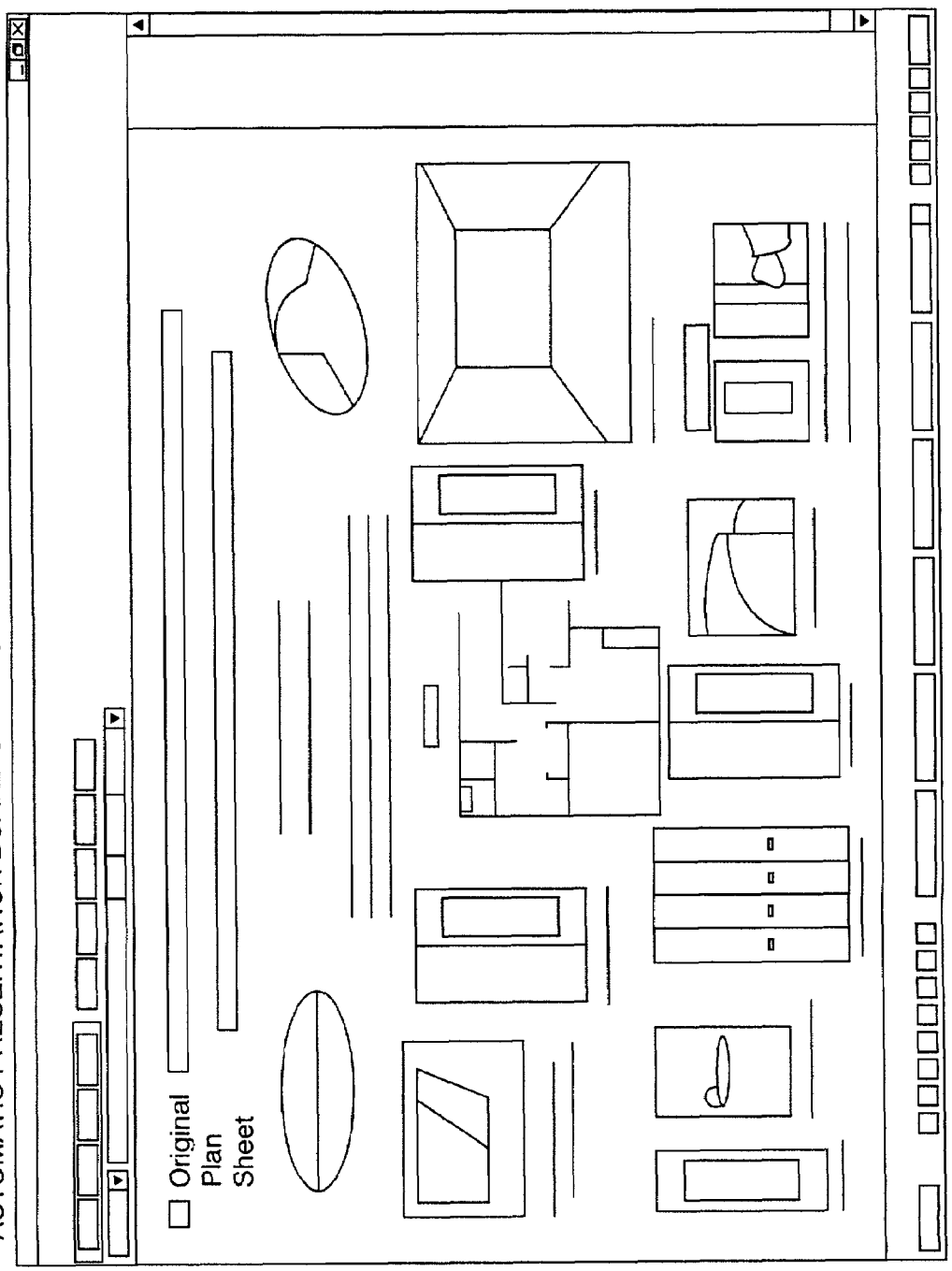
FIG. 18 is a diagram showing an automatic presentation board creation screen.

FIG. 18 shows an automatic presentation board creation screen. The screen is displaying an example of a created board. Photographs which represent images of the building materials used have been arranged around a floor plan. Sights of completed rooms, scenery of a planned building site, etc. may be pasted as desired.

FIG. 19 shows an example of a home page created automatically. In addition to quotation-related data, it can provide a lot of information on various topics including the state and appearance of the planned building site.

By using the product ordering method and system of the present invention, it is possible to increase the efficiency in preparing quotations for products considerably, improve service, and reduce the time required to place orders, resulting in shorter delivery lead times. Also, a presentation board and miniature house are provided simultaneously with an order placement and receipt, allowing the customer who places the order to check the content of the order properly. Also, even if it becomes necessary to place another order as a result of the check, the use of CAD data and plan information alleviates the trouble of entering data for reordering greatly. Consequently, the customer can place an order again with ease, resulting in higher customer satisfaction.

What is claimed is:

1. A product ordering system for placing and receiving an order for a product, the product ordering system comprising:
 a terminal of a purchaser having a means for sending Computer Aided Design (CAD) drawing data with a basic specification of the product ordered by said purchaser, said basic specification being a first piece of product-identifying information;
 a host computer of a supplier connected to said terminal via a network, said CAD drawing data with said basic specification being transmitted from said purchaser terminal to said host computer, said host computer having a means for managing product catalog information and customer planning information, said product catalog information including price information of the product, said customer planning information being registered in advance based on past order records and an arrangement record including other records and information of said purchaser, said customer planning information being a second piece of product-identifying information, said host computer having:
 a means for receiving said CAD drawing data sent from said terminal;
 a means for extracting said basic specification from said received CAD drawing data;
 a means for searching said product catalog information and said customer planning information based on said extracted basic specification;
 a means for creating quotation data based on said CAD drawing data, said searched product catalog information, and said searched customer planning information; and
 a means for sending said quotation data to said terminal.

2. A product ordering method for placing and receiving an order for a product, the method comprising:
 sending to a host computer of a supplier by a terminal of a purchaser having a means for sending Computer Aided Design (CAD) drawing data with a basic specification of the product ordered by said purchaser, said basic specification being one piece of information to identify the product;
 receiving at said host computer of a supplier connected to said terminal via a network said CAD drawing data with said basic specification, said host computer having a means for managing product catalog information and customer planning information, said product catalog information including price information of the product, said customer planning information being registered in advance based on past order records and an arrangement record including other records and information of said purchaser, said customer planning information being another part of a total amount of information about the product to identify the product, said host computer having:
 a means for receiving said CAD drawing data sent from said terminal;
 a means for extracting said basic specification from said received CAD drawing data received;
 a means for searching said product catalog information and said customer planning information using said extracted basic specification by a means for creating quotation data based on said CAD drawing data, said searched product catalog information and said searched customer planning information; and
 a means for sending said quotation data to said terminal.

3. A product ordering method according to claim 2, wherein said CAD drawing data sent from said terminal contains only said basic specification, and said means for creating said quotation data creates said quotation data by searching said product catalog information based on said basic specification extracted and said customer planning information.

4. A product ordering method according to claim 2, wherein said host computer creates at least one of a presentation board, a miniature house, and a customer-specific home page using internal data, said basic specification, and said customer planning information; and transmits at least one of said presentation board, said miniature house, and said customer-specific home page to said purchaser.

5. A product ordering method according to claim 2, wherein said host computer searches said product catalog information and said customer planning information using extracted said basic specification.

6. A product ordering method according to claim 2, wherein said network is the Internet.

7. A product ordering method according to claim 2, wherein said purchaser is permitted to view a customer-specific homepage when said purchaser enters a password printed on said presentation board given to said purchaser.

* * * * *